(12) United States Patent
Hou et al.

(10) Patent No.: US 10,664,581 B2
(45) Date of Patent: May 26, 2020

(54) BIOMETRIC-BASED AUTHENTICATION METHOD, APPARATUS AND SYSTEM

(71) Applicant: TENCENT TECHNOLOGY (SHENZHEN) COMPANY LIMITED, Shenzhen (CN)

(72) Inventors: Jie Hou, Shenzhen (CN); Pengfei Xiong, Shenzhen (CN); Hailong Liu, Shenzhen (CN); Bo Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/131,844

(22) Filed: Sep. 14, 2018

(65) Prior Publication Data
US 2019/0012450 A1 Jan. 10, 2019

Related U.S. Application Data

(63) Continuation of application No. 14/478,024, filed on Sep. 5, 2014, now Pat. No. 10,108,792, which is a
(Continued)

(30) Foreign Application Priority Data

Mar. 19, 2012 (CN) .......................... 2012 1 0072147

(51) Int. Cl.
*G06F 21/32* (2013.01)
*G06K 9/00* (2006.01)
(Continued)

(52) U.S. Cl.
CPC ......... *G06F 21/32* (2013.01); *G06K 9/00926* (2013.01); *G06K 9/00979* (2013.01);
(Continued)

(58) Field of Classification Search
USPC ............ 726/7, 2, 21, 36; 713/150, 163, 181; 380/255, 264, 276
See application file for complete search history.

(56) References Cited

U.S. PATENT DOCUMENTS 7,506,162 B1 * 3/2009 Hsu ..................... H04L 63/0815
713/168
7,836,510 B1 * 11/2010 Angal ................. G06F 21/6218
705/51

(Continued)

FOREIGN PATENT DOCUMENTS

| CN | 1728156 A | 2/2006 |
| CN | 101226590 A | 7/2008 |

(Continued)

OTHER PUBLICATIONS

International Search Report in Application No. PCT/CN2013/072531 dated Jun. 6, 2013.
(Continued)

*Primary Examiner* — Sharif E Ullah
(74) *Attorney, Agent, or Firm* — Oblon, McClellan, Maier & Neustadt, L.L.P.

(57) ABSTRACT

A biometric-based authentication method, an apparatus, and a system are described. The method includes: receiving a biometric image to be authenticated sent from a client; performing feature extraction to the biometric image to be authenticated to obtain a biometric template to be authenticated; comparing the biometric template to be authenticated with a locally-stored biometric template; and returning an authentication result. In this case, the feature extraction process may be implemented at a cloud server side, as such, the complexity of the client may be reduced, the expandability of the client may be increased, a limitation that the biometric recognition may only be implemented on the
(Continued)

client may be eliminated, and diversified utilization may be supported.

20 Claims, 9 Drawing Sheets

Related U.S. Application Data continuation of application No. PCT/CN2013/072531, filed on Mar. 13, 2013.

(51) Int. Cl.
  *H04L 29/08* (2006.01)
  *H04L 9/32* (2006.01)
  *H04L 29/06* (2006.01)
  *H04W 12/06* (2009.01)

(52) U.S. Cl.
  CPC ........ *H04L 9/3231* (2013.01); *H04L 63/0861* (2013.01); *H04L 67/10* (2013.01); *H04L 63/0876* (2013.01); *H04L 69/04* (2013.01); *H04W 12/06* (2013.01)

(56) References Cited

U.S. PATENT DOCUMENTS

| | | | |
|---|---|---|---|
| 8,869,244 B1* | 10/2014 | Sundaram | G06F 21/6218 726/4 |
| 2004/0177097 A1* | 9/2004 | Yu | G06F 21/32 |
| 2004/0250085 A1 | 12/2004 | Tattan et al. | |
| 2006/0218630 A1* | 9/2006 | Pearson | G06F 21/41 726/8 |
| 2007/0183633 A1* | 8/2007 | Hoffmann | G06K 9/00221 382/116 |
| 2007/0192326 A1* | 8/2007 | Angal | G06F 11/1482 |
| 2008/0086759 A1* | 4/2008 | Colson | G06F 21/34 726/2 |
| 2008/0178262 A1* | 7/2008 | Taniguchi | G07C 9/38 726/2 |
| 2010/0115114 A1* | 5/2010 | Headley | G06F 21/32 709/229 |
| 2010/0246902 A1* | 9/2010 | Rowe | G06K 9/2018 382/115 |
| 2011/0001607 A1* | 1/2011 | Kamakura | G06K 9/00087 340/5.82 |
| 2011/0037563 A1 | 2/2011 | Choi et al. | |
| 2011/0153727 A1* | 6/2011 | Li | G06F 9/5055 709/203 |
| 2011/0251954 A1* | 10/2011 | Chin | G06F 3/04883 705/40 |
| 2011/0277016 A1* | 11/2011 | Hockings | G06F 21/41 726/4 |
| 2012/0005736 A1* | 1/2012 | Takahashi | G07F 7/1008 726/7 |
| 2012/0290592 A1* | 11/2012 | Ishii | G06F 21/6227 707/754 |
| 2013/0066770 A1* | 3/2013 | Das | G06F 9/452 705/39 |
| 2013/0066945 A1* | 3/2013 | Das | G06F 15/16 709/203 |
| 2013/0067345 A1* | 3/2013 | Das | G06F 8/63 715/740 |
| 2013/0067469 A1* | 3/2013 | Das | G06F 9/5077 718/1 |
| 2013/0073670 A1* | 3/2013 | Das | G06F 9/5027 709/217 |
| 2013/0073703 A1* | 3/2013 | Das | G06F 9/5072 709/223 |
| 2013/0074064 A1* | 3/2013 | Das | G06F 8/61 718/1 |
| 2013/0074179 A1* | 3/2013 | Das | G06F 9/452 726/18 |
| 2013/0110922 A1* | 5/2013 | Shih | G06Q 50/01 709/204 |
| 2013/0138964 A1* | 5/2013 | Joyce, III | H04L 9/3236 713/176 |
| 2013/0276085 A1* | 10/2013 | Sharaga | H04L 65/60 726/8 |

FOREIGN PATENT DOCUMENTS

| | | |
|---|---|---|
| CN | 101266704 A | 9/2008 |
| CN | 101414351 A | 4/2009 |
| CN | 101763429 A | 6/2010 |
| CN | 201904809 U | 7/2011 |
| CN | 102333091 A | 1/2012 |
| CN | 102360355 A | 2/2012 |
| CN | 102646190 A | 8/2012 |
| JP | 2008123216 A | 5/2008 |
| KR | 2003-0006789 A | 1/2003 |
| KR | 2011-0018130 A | 2/2011 |
| KR | 2011-0033281 A | 3/2011 |
| RU | 2306603 C1 | 9/2007 |

OTHER PUBLICATIONS

Office Action in CN Application No. 201210072147.2 dated May 13, 2013, 22 pages.
Office Action in KR Application No. 10-2014-7029180 dated Jan. 13, 2016, 8 pages.
Office Action in RU Application No. 2014141345 dated Dec. 9, 2015, 11 pages.
International Preliminary Report on Patentability and Written Opinion in International Application No. PCT/CN2013/072531 dated Sep. 23, 2014, 17 pages.

* cited by examiner

BIOMETRIC-BASED AUTHENTICATION METHOD, APPARATUS AND SYSTEM

CROSS-REFERENCE TO RELATED APPLICATIONS

This application is a continuation of U.S. Ser. No. 14/478,024 filed Sep. 5, 2014, which is a U.S. continuation of International Application No. PCT/CN2013/072531, filed Mar. 13, 2013. This application claims the benefit and priority of Chinese Patent Application No. 201210072147.2, filed Mar. 19, 2012. The entire disclosures of each of the above applications are incorporated herein by reference.

FIELD OF THE INVENTION

The present disclosure relates to a computer field, and more particularly, to a biometric-based authentication method, an apparatus, and a system.

BACKGROUND OF THE INVENTION

Biometric recognition technology may be defined to mean to identify individual identity using human physiological features or behavioral features. In current information age, how to accurately identify the identity of a person and protect information security has become a crucial social issue that must be addressed. Traditional identity authentication may easily be forged and lost, and thus be more and more difficult to meet social requirements. Currently, the most safe and convenient solution may be the biometric recognition technology, which may be simple and rapid. Further, identity authentication using the biometric recognition technology may be very safe, reliable, and accurate.

Currently, the biometric recognition technology may mainly include human face recognition, fingerprint recognition, and iris recognition, etc. Taking the face recognition as an example, currently there are a variety of authentication services based on the face recognition. For example, an attendance checking service based on hardware like an attendance checking device, in which a human face may be collected and matched locally, and functions of face attendance checking and access control may be achieved, e.g., a face attendance checking device of some companies. Another example may be a login service based on a computer and a mobile terminal, such as face-verification boot of some notebooks, and face-verification unlock of some smart phones.

SUMMARY OF THE INVENTION

In an aspect of the present disclosure, a biometric-based authentication method is provided. The method includes:

receiving, by a cloud server, a biometric image to be authenticated sent from a client;

performing, by the cloud server, feature extraction to the biometric image to be authenticated to obtain a biometric template to be authenticated;

comparing, by the cloud server, the biometric template to be authenticated with a biometric template stored in the cloud server; and returning an authentication result to the client.

In another aspect of the present disclosure, a biometric-based authentication method is provided. The method includes:

collecting, by a client, a user image;

performing, by the client, biometric-positioning processing to the user image to obtain a biometric image to be authenticated;

transmitting, by the client, the biometric image to be authenticated to a cloud server, so that the cloud server performs feature extraction to the biometric image to be authenticated to obtain a biometric template to be authenticated, and compares the biometric template to be authenticated with a biometric template stored in the cloud server; and receiving, by the client, an authentication result returned from the cloud server.

In another aspect of the present disclosure, a cloud server is provided. The cloud server includes:

an access module, to receive a biometric image to be authenticated sent from a client;

an authentication module, to perform feature extraction to the biometric image to be authenticated to obtain a biometric template to be authenticated, compare the biometric template to be authenticated with a biometric template stored in a data module, and return an authentication result to the client; and the data module, to store the biometric template.

In another aspect of the present disclosure, a client is provided. The client includes:

a collecting module, to collect a user image, and perform biometric-positioning processing to the user image to obtain a biometric image to be authenticated;

a transmitting module, to transmit the biometric image to be authenticated to a cloud server, so that the cloud server performs feature extraction to the biometric image to be authenticated to obtain a biometric template to be authenticated, and compares the biometric template to be authenticated with a biometric template stored in the cloud server; and a receiving module, to receive an authentication result returned from the cloud server.

In another aspect of the present disclosure, a biometric-based authentication system is provided. The system includes:

a cloud server, to receive a biometric image to be authenticated sent from a client, perform feature extraction to the biometric image to be authenticated to obtain a biometric template to be authenticated, compare the biometric template to be authenticated with a biometric template stored in the cloud server, and return an authentication result to the client; and the client, to collect a user image, perform biometric-positioning processing to the user image to obtain the biometric image to be authenticated, transmit the biometric image to be authenticated to the cloud server, and receive the authentication result returned from the cloud server.

BRIEF DESCRIPTION OF DRAWINGS

Hereinafter, accompanying drawings used to describe examples of the present disclosure may be briefly introduced to make the technical solution of the present disclosure clearer. Obviously, the drawings described below may be some example embodiments of the present disclosure. According to these drawings, those skilled in the art may also obtain other drawings without making creative efforts.

DETAILED DESCRIPTION OF THE INVENTION

Hereinafter, the present disclosure will be described in further detail with reference to the accompanying drawings and exemplary examples.

Conventionally, biometric recognition techniques may all be implemented on a client. The utilization of the conventional biometric recognition techniques may be limited, may not support multi-client expansion, and lack diversified functions. Further, the authentication performed on the client may lead to relatively complex authentication logic of the client.

According to an example of the present disclosure, a client may include but may not be limited to a cell phone, a tablet personal computer (PC), a laptop PC, a PC, a vehicle-mounted electronic system, a personal digital assistant (PDA), etc. The client may be any peripherals that can be connected to the internet, which may not be particularly limited in examples of the present disclosure.

Figure 1:
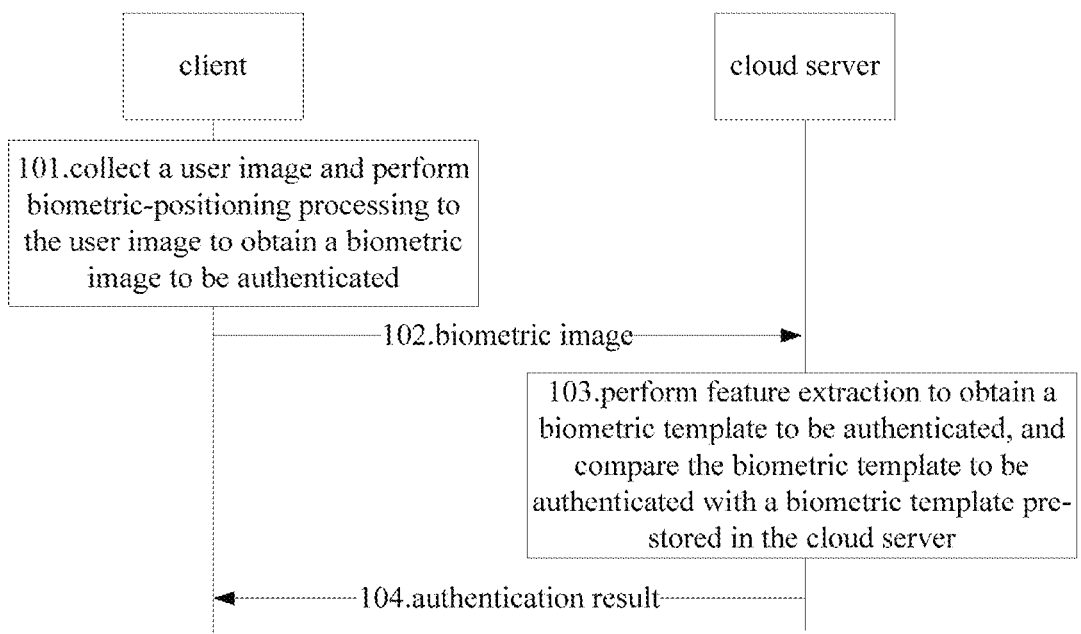
FIG. 1 is a flowchart illustrating a biometric-based authentication method, according to an example of the present disclosure.

As shown in FIG. 1, an example of the present disclosure may provide a biometric-based authentication method, which may include the following operations.

In block 101, a client may collect a user image and perform biometric-positioning processing to the user image to obtain a biometric image to be authenticated.

In block 102, the client may send the biometric image to be authenticated to a cloud server.

In block 103, the cloud server may perform feature extraction to the biometric image to be authenticated to obtain a biometric template to be authenticated, and compare the biometric template to be authenticated with a biometric template pre-stored in the cloud server.

In block 104, the cloud server may return an authentication result to the client.

Examples of the present disclosure provide a biometric-based authentication method, in which a client may obtain a biometric image and send the biometric image to a cloud server; the cloud server may perform feature extraction to the biometric image to obtain a biometric template, and may perform biometric-based authentication to a user or the client. In this case, the feature extraction process may be implemented at the cloud server side, as such, the complexity of the client may be reduced, the expandability of the client may be increased, a limitation that the biometric recognition may only be implemented on the client may be eliminated, and diversified utilization may be supported.

The method provided by the examples of the present disclosure may implement a biometric-based registration and authentication service of the user. In this case, the authentication service may include a verification service and a recognition service. Furthermore, an example of the present disclosure may provide the architecture as shown in FIG. 2 to achieve the above functions.

Figure 2:
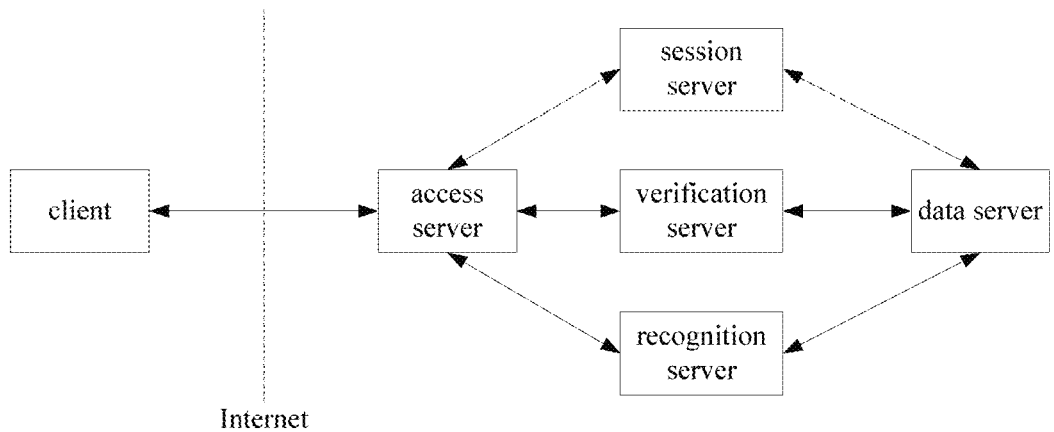
FIG. 2 is a schematic diagram illustrating network architecture for implementing biometric-based registration and authentication service, according to an example of the present disclosure.

As shown in FIG. 2, an access server, a session server, a verification server, a recognition server, and a data server may form a cloud server. Among them, the access server may exchange data with the client, or with other servers included in the cloud server through an internet-based protocol like a hypertext transfer protocol (HTTP) or a transmission control protocol (TCP);

the session server may implement a biometric-based registration service of the user;

the verification server may implement a biometric-based verification service of the user;

the recognition server may implement a biometric-based recognition service of the user; and the data server may store a user identifier (user ID), a client ID, a legitimate biometric template, and a relationship associated with the user ID, the client ID, and the legitimate biometric template.

According to an example of the present disclosure, a biometric-based registration method may be provided. It should be noted that before the user performs the biometric-based authentication through the client, the biometric-based registration may be performed, in which the user ID, the client ID, and the legitimate biometric template may be associated with each other at the cloud server side.

Figure 3:
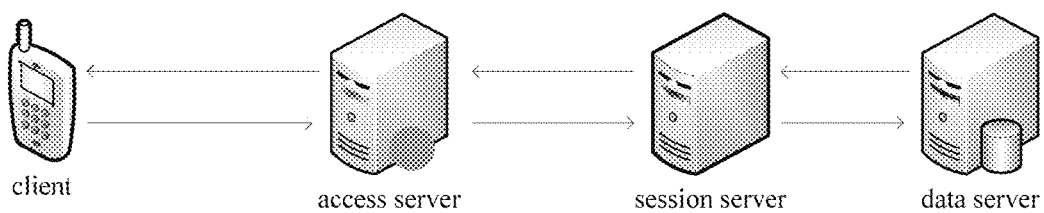
FIG. 3 is a schematic diagram illustrating network architecture for implementing biometric-based registration, according to an example of the present disclosure.

Examples of the present disclosure may be implemented, based on the architecture as shown in FIG. 3, to implement the registration. FIG. 3 is a schematic diagram illustrating the network architecture for implementing the biometric-based registration, according to an example of the present disclosure. As shown in FIG. 3, the network architecture may include a client, an access server, a session server, and a data server.

It should be note that the example of the present disclosure and examples described later may be illustrated taking the face recognition as a biometric recognition technique. However, examples of the present disclosure may not be limited to the face recognition. Other biometric-based techniques such as iris recognition and fingerprint recognition may also be applicable to the examples of the present disclosure.

Figure 4:
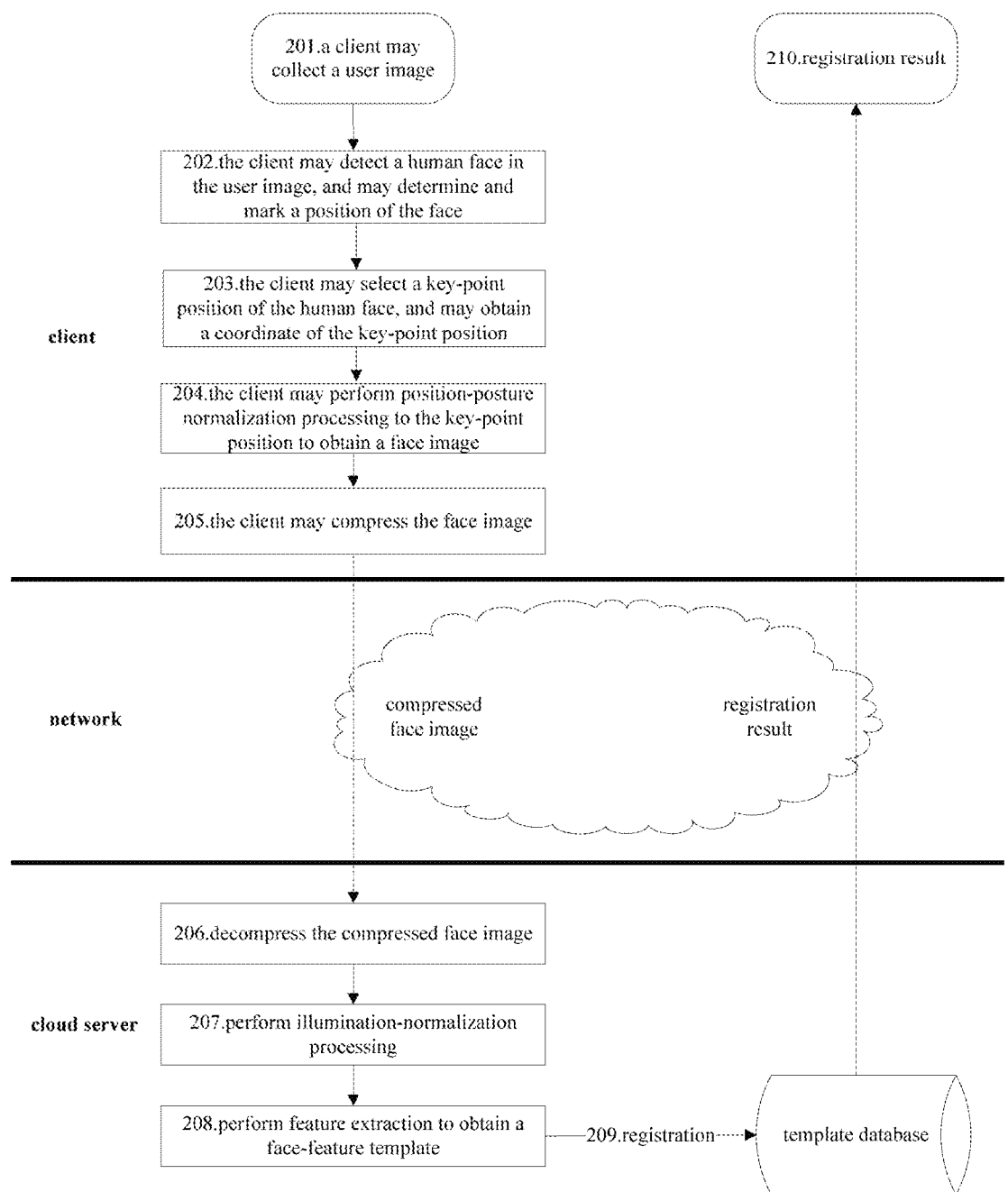
FIG. 4 is a flowchart illustrating a biometric-based registration method, according to an example of the present disclosure.

As shown in FIG. 4, an example of the present disclosure may provide a biometric-based registration method, which may include the following operations.

In block 201, a client may collect a user image.

In this case, the client may collect the user image. Specifically, the client may collect the user image from local pictures or videos, or may collect the user image through other collection devices, such as a camera in a mobile phone.

In block 202, the client may detect a human face in the user image, and may determine and mark a position of the face.

Specifically, when there is a human face in the user image, the position of the face may be determined and marked.

The operations in block 202 may be implemented by means of Haar features plus an adaboost face detection algorithm. The Haar features may be divided into three categories including an edge feature, a linear feature, as well as a center feature and a diagonal feature. The adaboost face detection algorithm may include Haar feature selection and feature calculation. Among them, the feature calculation may be implemented by means of an integral image method. According to the integral image method, the three categories of the Haar features may be combined to form a feature template, in which there are a white rectangle and a black rectangle, and a feature value of the template may be obtained by subtracting a pixel sum of the black rectangle from a pixel sum of the white rectangle.

According to the main concept of the integral image, a sum of pixels of each rectangle area in an image, which may be formed from a starting point to each point in the image, may be stored in a memory as an element of an array. When a pixel sum of an area is to be calculated, an element of the array may directly be used without re-calculating the pixel sum of the area, so that the calculation may be accelerated. When there are various sizes of a same area, the integral image may calculate different features of the area using the same time, as such, the detection speed may be greatly improved.

The adaboost algorithm may be a conventional way of face detection, and may not be repeated herein.

It should be noted that more accurate positioning may be obtained under a small posture of the human face, in which a position of the human face is at a left-right inclination from −30 degrees to 30 degrees.

In block 203, the client may select a key-point position on the human face, and may obtain a coordinate of the key-point position.

According to an example of the present disclosure, an eye and a mouth on the human face may be selected as the key-point position. As such, the operation of selecting the key-point position on the human face and obtaining the coordinate of the key-point position may include:
  determining and marking positions of the eye and the mouth on the obtained face area,
  obtaining a candidate eye area and a candidate mouth area through image projection,
  obtaining, on the candidate eye area, an accurate coordinate of a center of the eye using the Haar feature plus the adaboost algorithm, and
  obtaining, on the candidate mouth area, an accurate coordinate of a corner of the mouth using gabor feature plus the adaboost algorithm.

In this case, the extraction of the gabor feature may be a conventional way of the face recognition, and may not be repeated herein.

In block 204, the client may perform position-posture normalization processing to the key-point position to obtain a face image.

In this case, the operation of performing the position-posture normalization processing to the key-point position to obtain the face image may include:
  based on the obtained positions of the eye and the mouth, i.e., the accurate coordinate of the center of the eye and the accurate coordinate of the corner of the mouth, converting the original user image to a standard human face template through normalization operations, which may include clipping, zooming, posture correcting, etc., so as to ensure that the eye and the mouth may be in a standard position on the standard face template, and thus the standard face image may be obtained.

In block 205, the client may compress the face image and send the compressed face image to a cloud server through a network.

In this case, when the compressed face image is sent to the cloud server, a user ID and a client ID may be sent to the cloud server, as well.

In block 206, the cloud server may decompress the compressed face image.

In block 207, illumination-normalization processing may be performed to the decompressed face image.

In this case, the accuracy of the face recognition may be decreased due to different intensities and directions of lights acting on the human face. As such, the obtained face image may be under a same illumination condition through the illumination-normalization processing, and therefore the accuracy of the face recognition may be improved.

In block 208, the cloud server may perform feature extraction to obtain a face-feature template.

According to an example of the present disclosure, the operation of performing, by the cloud server, the feature extraction to obtain the face-feature template may include:
  performing, on the face image processed with the illumination normalization, global partitioning feature extraction, which may include gabor local features, local binary patterns (LBP), and histograms of oriented gradients (HOG),
  performing dimension-reducing calculation to an extracted feature using a linear discriminant analysis (LDA) model, and
  linking results of the dimension-reducing calculation one by one to obtain the face-feature template.

In this case, the LDA may be a collection-probability model, and may process a discrete data collection and reduce the dimension.

In block 209, the registration based on the human face feature may be implemented.

According to an example of the present disclosure, the operations in block 209 may include:

the cloud server creating and storing a relationship associated with the user ID, the client ID, and the legitimate face-feature template to complete the registration of the user. Among them, the relationship associated with the user ID, the client ID, and the legitimate face-feature template may be stored in a template database of the cloud server.

In block 210, a registration result may be returned to the client.

Examples of the present disclosure provide a biometric-based registration method, in which a user or a client may transmit a biometric image to a cloud server for registering, and a relationship associated with a user ID, a client ID, and the biometric image may be stored in the cloud server. As such, the biometric authentication may be performed based on the internet, so that the complexity of the client may be reduced, the expandability of the client may be increased, a limitation that the biometric recognition may only be implemented on the client may be eliminated, and diversified utilization may be supported.

Figure 5:
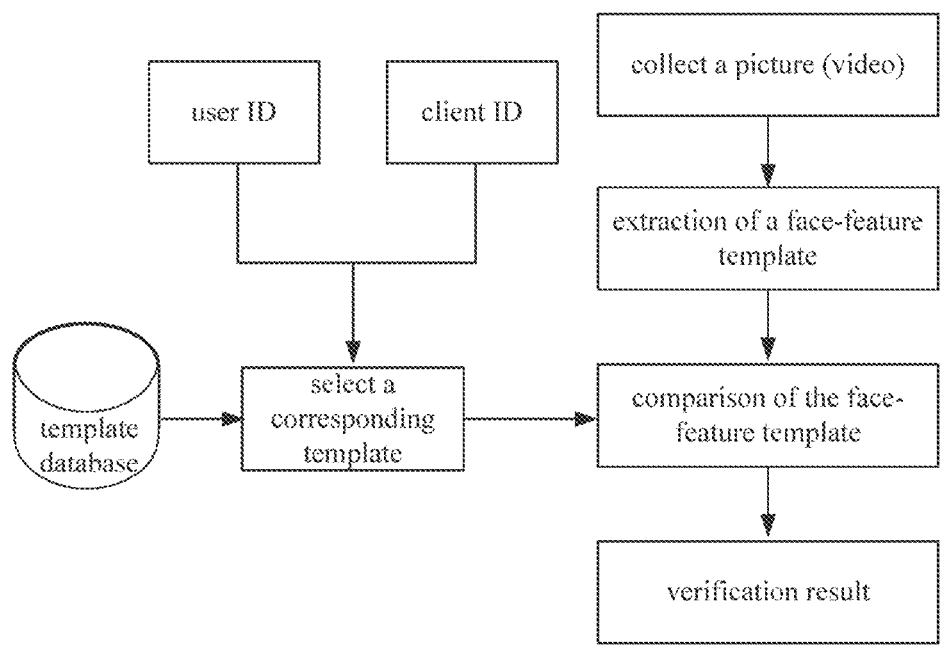
FIG. 5 is a flowchart illustrating a biometric-based verification method, according to an example of the present disclosure.

Examples of the present disclosure provide a biometric-based verification method. FIG. 5 is a flowchart illustrating the biometric-based verification method, according to an example of the present disclosure. As shown in FIG. 5, a face-feature template to be verified of a user may be obtained through feature extraction, a template corresponding to a user ID and a client ID may be selected from a template database in the cloud server and may be compared with the face-feature template to be verified. As such, the biometric-based verification of the user and the client may be implemented, and the permission of the user for using the client may be determined.

Figure 6:
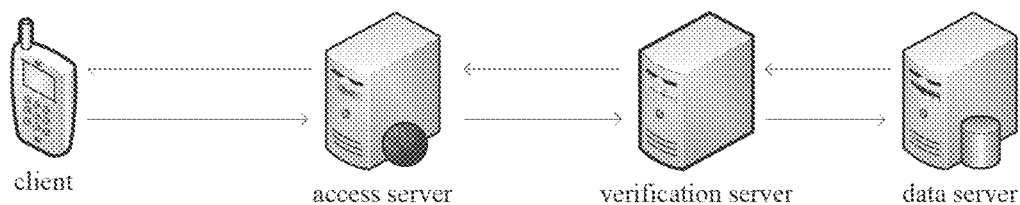
FIG. 6 is a schematic diagram illustrating network architecture for implementing biometric-based verification, according to an example of the present disclosure.

An example of the present disclosure may provide the architecture as shown in FIG. 6 to implement the biometric-based verification. FIG. 6 is a schematic diagram illustrating the network architecture for implementing the biometric-based verification, according to an example of the present disclosure. As shown in FIG. 6, the network architecture may include a client, an access server, a verification server, and a data server. Examples of the present disclosure may be illustrated still taking the face recognition as the biometric recognition technique.

Figure 7:
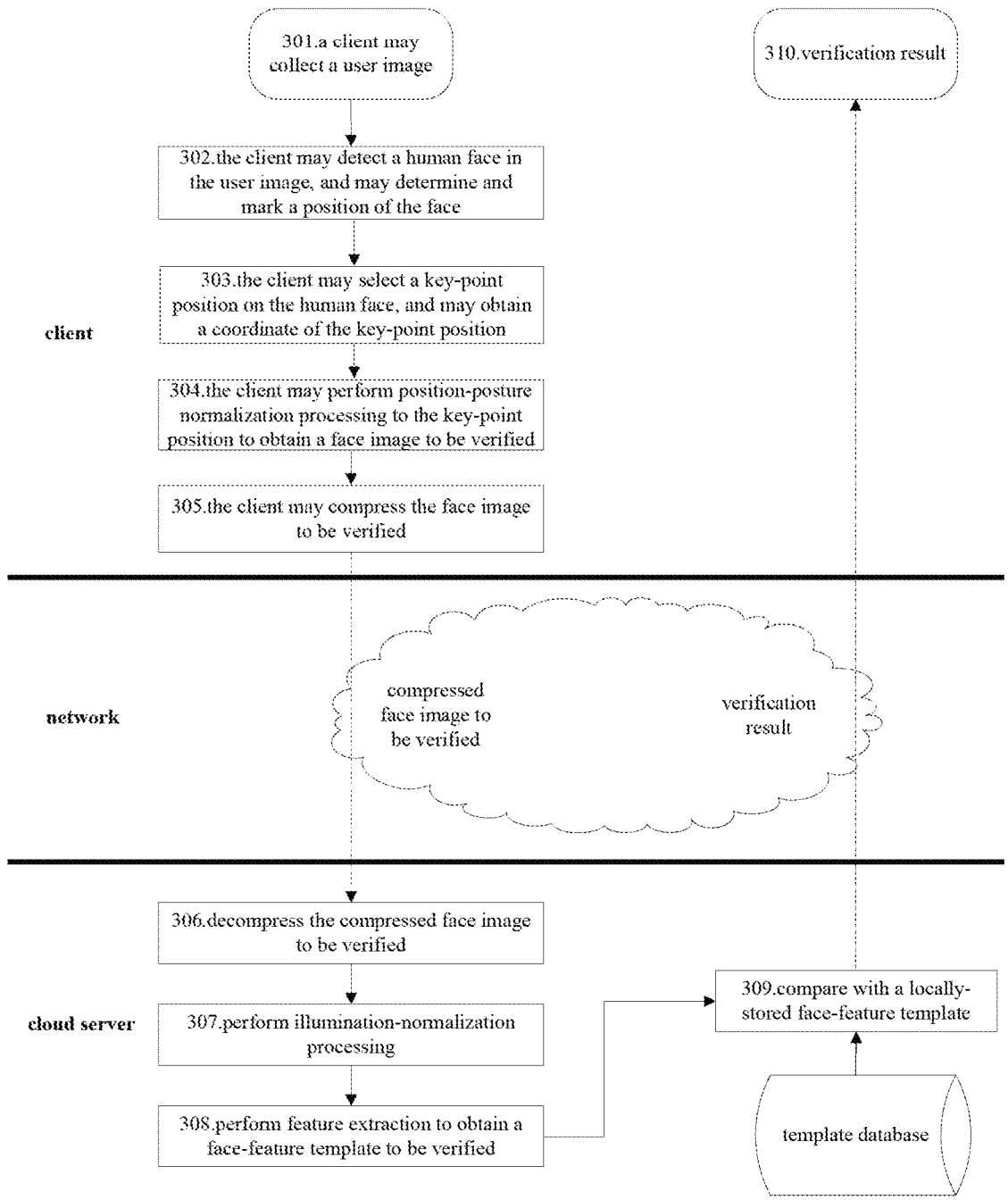
FIG. 7 is a flowchart illustrating a biometric-based verification method, according to an example of the present disclosure.

As shown in FIG. 7, an example of the present disclosure may provide a biometric-based verification method, which may include the following operations.

In block 301, a client may collect a user image.

In this case, the client may collect the user image. Specifically, the client may collect the user image from local pictures or videos, or may collect the user image through other collection devices, such as a camera in a mobile phone.

In block 302, the client may detect a human face in the user image, and may determine and mark a position of the face.

Specifically, when there is a human face in the user image, the position of the face may be determined and marked.

The operations in block 302 may be implemented by means of the Haar features plus the adaboost face detection algorithm. Implementation of the operations in block 302 may be the same as that of the operations in block 202 in the aforementioned biometric-based registration method, which may not be repeated herein.

It should be noted that more accurate positioning may be obtained under a small posture of the human face, in which a position of the human face is at a left-right inclination from −30 degrees to 30 degrees.

In block 303, the client may select a key-point position on the human face, and may obtain a coordinate of the key-point position.

According to an example of the present disclosure, an eye and a mouth on the human face may be selected as the key-point position. As such, the operation of selecting the key-point position on the human face and obtaining the coordinate of the key-point position may include:

determining and marking positions of the eye and the mouth on the obtained face area, obtaining a candidate eye area and a candidate mouth area through image projection, obtaining, on the candidate eye area, an accurate coordinate of a center of the eye using the Haar feature plus the adaboost algorithm, and obtaining, on the candidate mouth area, an accurate coordinate of a corner of the mouth using the gabor feature plus the adaboost algorithm.

In this case, the extraction of the gabor feature may be a conventional way of the face recognition, and may not be repeated herein.

In block 304, the client may perform position-posture normalization processing to the key-point position to obtain a face image to be verified.

In this case, the operation of performing the position-posture normalization processing to the key-point position to obtain the face image to be verified may include:

based on the obtained positions of the eye and the mouth, i.e., the accurate coordinate of the center of the eye and the accurate coordinate of the corner of the mouth, converting the original user image to a standard face template through normalization operations, which may include clipping, zooming, posture correcting, etc., so as to ensure that the eye and the mouth may be in a standard position on the standard face template, and thus the standard face image to be verified may be obtained.

In block 305, the client may compress the face image to be verified and send the compressed face image to be verified to a cloud server through a network.

In this case, when the compressed face image to be verified is sent to the cloud server, a user ID and a client ID may be sent to the cloud server, as well.

In block 306, the cloud server may decompress the compressed face image to be verified.

In block 307, illumination-normalization processing may be performed to the decompressed face image to be verified.

In this case, the accuracy of the face recognition may be decreased due to different intensities and directions of lights acting on the human face. As such, the obtained face image may be under a same illumination condition through the illumination-normalization processing, and therefore the accuracy of the face recognition may be improved.

In block 308, the cloud server may perform the feature extraction to obtain a face-feature template to be verified.

According to an example of the present disclosure, the operation of performing, by the cloud server, the feature extraction to obtain the face-feature template to be verified may include:

performing, on the face image to be verified processed with the illumination normalization, global partitioning feature extraction, which may include gabor local features, LBP, and HOG, performing dimension-reducing calculation to an extracted feature using a LDA model, and linking results of the dimension-reducing calculation one by one to obtain the face-feature template to be verified.

In this case, the LDA may be a collection-probability model, and may process a discrete data collection and reduce the dimension.

In block 309, the face-feature template to be verified may be compared with a locally-stored face-feature template, and a verification result may be returned.

In this case, the operation of comparing the face-feature template to be verified with the locally-stored face-feature template and returning the verification result may include the following processes.

In process 309-1, a face-feature template associated with the user ID and the client ID may be obtained from the template database.

In process 309-2, similarity between the face-feature template to be verified and the face-feature template associated with the user ID and the client ID may be calculated.

According to an example of the present disclosure, the calculation of the similarity may employ a cosine distance and k-nearest neighbor (KNN) algorithm, which may not be repeated herein.

In process 309-3, it may be determined whether the calculated similarity is greater than a predetermined verification threshold. In response to a determination that the calculated similarity is greater than the predetermined verification threshold, the verification may be passed. In response to a determination that the calculated similarity is not greater than the predetermined verification threshold, the verification may not be passed.

In block 310, a verification result may be returned to the client.

According to an example of the present disclosure, the biometric-based verification method may be illustrated as follows. It may be assumed that a user A logs in an instant messaging (IM) application, such as Tencent QQ, at a mobile phone A (i.e., a client), and a login password is a face of the user A. As such, a process of verifying the user A may be illustrated as follows. The user A may input, at the mobile phone A, a QQ number A (i.e., a user ID) that is registered by the user A. Meanwhile, the user A may collect the face of the user A using the mobile phone A and may send the QQ number A, the face of the user A, and an ID of the mobile phone A (i.e., a client ID) to a cloud server for verification. If the verification at the cloud server is passed, the user A may successfully log in the QQ number A at the mobile phone A.

Examples of the present disclosure provide a biometric-based verification method, in which a client may obtain a biometric image and send the biometric image to a cloud server; the cloud server may perform feature extraction to the biometric image to obtain a biometric template, and may perform biometric-based verification to a user or the client. In this case, the feature extraction process may be implemented at the cloud server side, so that the complexity of the client may be reduced, the expandability of the client may be increased, a limitation that the biometric recognition may only be implemented on the client may be eliminated, and diversified utilization may be supported.

Figure 8:
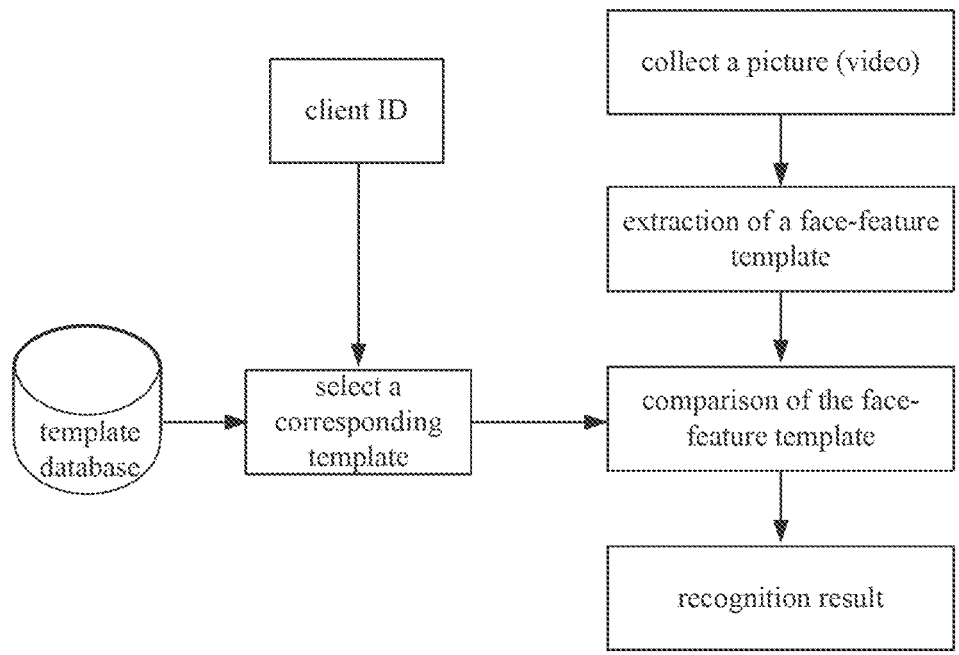
FIG. 8 is a flowchart illustrating a biometric-based recognition method, according to an example of the present disclosure.

Examples of the present disclosure provide a biometric-based recognition method. FIG. 8 is a flowchart illustrating the biometric-based recognition method, according to an example of the present disclosure. As shown in FIG. 8, a face-feature template to be recognized of a user may be obtained through feature extraction, and, a template associated with a client ID may be selected from a template database in a cloud server and may be compared with the face-feature template to be recognized. As such, the biometric-based recognition of the user and the client may be implemented, and a user ID corresponding to the face-feature template to be recognized may be obtained.

Figure 9:
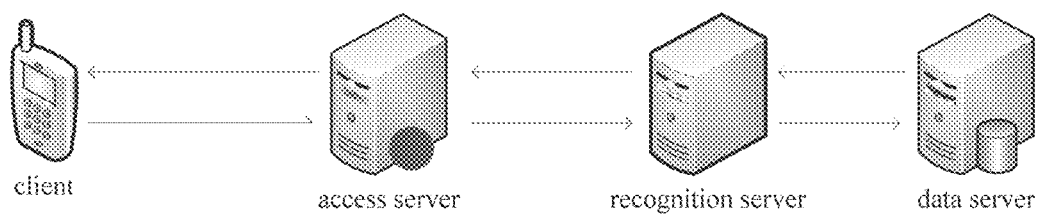
FIG. 9 is a schematic diagram illustrating network architecture for implementing biometric-based recognition, according to an example of the present disclosure.

An example of the present disclosure may provide the architecture as shown in FIG. 9 to implement the biometric-based recognition. FIG. 9 is a schematic diagram illustrating the network architecture for implementing the biometric-based recognition, according to an example of the present disclosure. As shown in FIG. 9, the network architecture may include a client, an access server, a recognition server, and a data server. Examples of the present disclosure may be illustrated still taking the face recognition as the biometric recognition technique.

Figure 10:
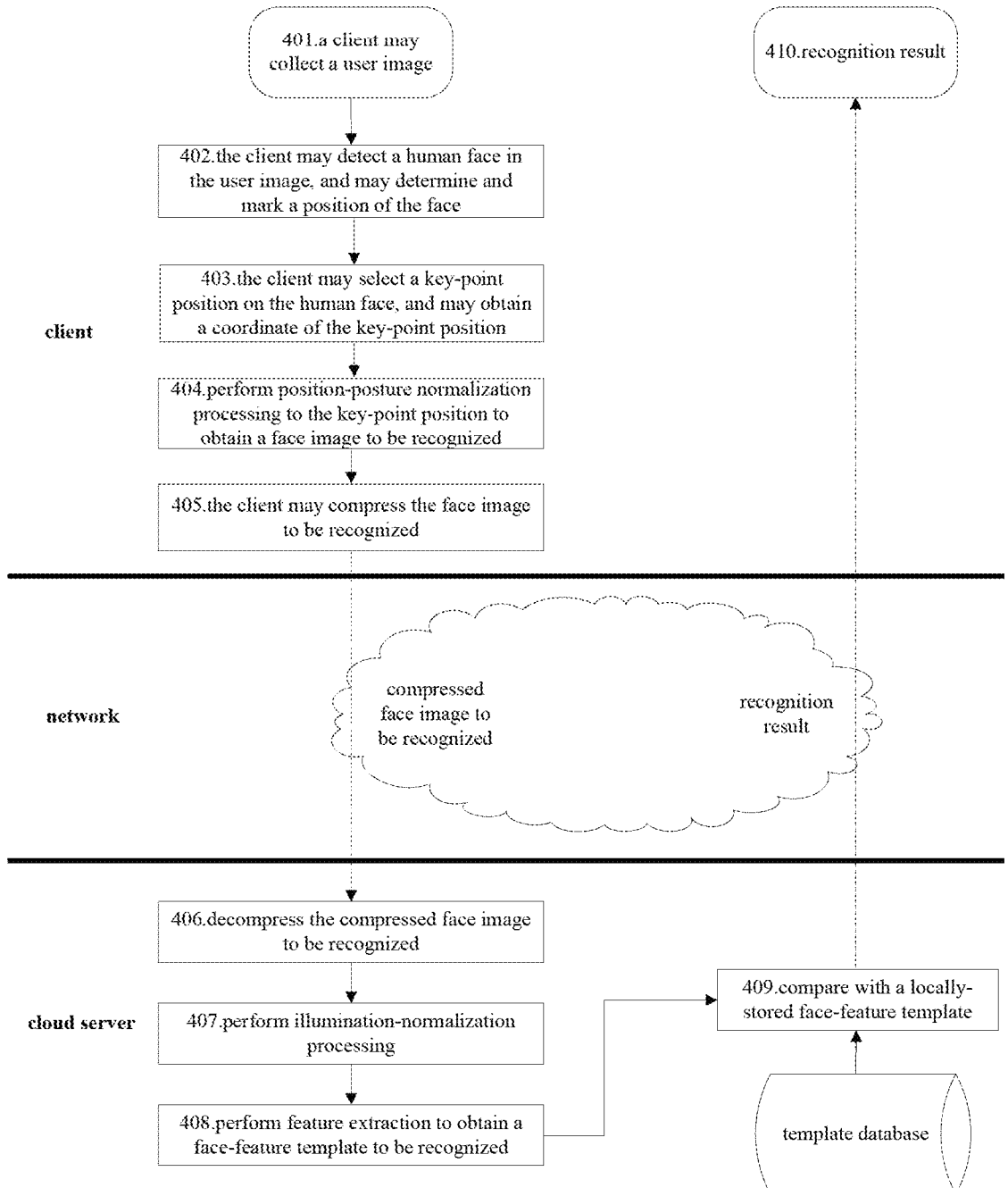
FIG. 10 is a flowchart illustrating a biometric-based recognition method, according to an example of the present disclosure.

As shown in FIG. 10, an example of the present disclosure may provide a biometric-based recognition method, which may include the following operations.

In block 401, a client may collect a user image.

In this case, the client may collect the user image. Specifically, the client may collect the user image from local pictures or videos, or may collect the user image through other collection devices, such as a camera in a mobile phone.

In block 402, the client may detect a human face in the user image, and may determine and mark a position of the face.

Specifically, when there is a human face in the user image, the position of the face may be determined and marked.

The operations in block 402 may be implemented by means of the Haar features plus the adaboost face detection algorithm. Implementation of the operations in block 402 may be the same as that of the operations in block 202 in the aforementioned biometric-based registration method, which may not be repeated herein.

It should be noted that more accurate positioning may be obtained under a small posture of the human face, in which a position of the human face is at a left-right inclination from −30 degrees to 30 degrees.

In block 403, the client may select a key-point position on the face, and may obtain a coordinate of the key-point position.

According to an example of the present disclosure, an eye and a mouth on the human face may be selected as the key-point position. As such, the operation of selecting the key-point position on the human face and obtaining the coordinate of the key-point position may include:

determining and marking positions of the eye and the mouth on the obtained face area, obtaining a candidate eye area and a candidate mouth area through image projection, obtaining, on the candidate eye area, an accurate coordinate of a center of the eye using the Haar feature plus the adaboost algorithm, and obtaining, on the candidate mouth area, an accurate coordinate of a corner of the mouth using gabor feature plus the adaboost algorithm.

In this case, the extraction of the gabor feature may be a conventional way of the face recognition, and may not be repeated herein.

In block 404, the client may perform position-posture normalization processing to the key-point position to obtain a face image to be recognized.

In this case, the operation of performing the position-posture normalization processing to the key-point position to obtain the face image to be recognized may include:

based on the obtained positions of the eye and the mouth, i.e., the accurate coordinate of the center of the eye and the accurate coordinate of the corner of the mouth, converting the original user image to a standard face template through normalization operations, which may include clipping, zooming, posture correcting, etc., so as to ensure that the eye and the mouth may be in a standard position on the standard face template, and thus the standard face image to be recognized may be obtained.

In block 405, the client may compress the face image to be recognized and send the compressed face image to be recognized to a cloud server through a network.

In this case, when the compressed face image to be recognized is sent to the cloud server, a client ID may be sent to the cloud server, as well.

In block 406, the cloud server may decompress the compressed face image to be recognized.

In block 407, illumination-normalization processing may be performed to the decompressed face image to be recognized.

In this case, the accuracy of the face recognition may be decreased due to different intensities and directions of lights acting on the human face. As such, the obtained face image may be under a same illumination condition through the illumination-normalization processing, and therefore the accuracy of the face recognition may be improved.

In block 408, the cloud server may perform the feature extraction to obtain a face-feature template to be recognized.

According to an example of the present disclosure, the operation of performing, by the cloud server, the feature extraction to obtain the face-feature template to be recognized may include:

performing, on the face image to be recognized processed with the illumination normalization, global partitioning feature extraction, which may include gabor local features, LBP, and HOG, performing dimension-reducing calculation to an extracted feature using a LDA model, and linking results of the dimension-reducing calculation one by one to obtain the face-feature template to be recognized.

In this case, the LDA may be a collection-probability model, and may process a discrete data collection and reduce the dimension.

In block 409, the face-feature template to be recognized may be compared with a locally-stored face-feature template, and a recognition result may be returned.

In this case, the operation of comparing the face-feature template to be recognized with the locally-stored face-feature template and returning the recognition result may include the following processes.

In process 409-1, a collection of a face-feature template associated with the client ID may be obtained from the template database.

In this case, the collection may include one or more than one face-feature templates associated with the client ID.

In process 409-2, a similarity between each face-feature template included in the collection and the face-feature template to be recognized may be calculated.

According to an example of the present disclosure, the calculation of the similarity may employ the cosine distance and KNN algorithm, which may not be repeated herein.

In process 409-3, it may be determined whether each calculated similarity is greater than a predetermined recognition threshold. In response to a determination that a calculated similarity is greater than the predetermined recognition threshold, process 409-4 may be performed. In response to a determination that a calculated similarity is not greater than the predetermined recognition threshold, the recognition may not be passed.

In process 409-4, a user ID associated with a face-feature template of which the similarity is greater than the predetermined recognition threshold may be added to a recognition result collection.

In process 409-5, the user ID in the recognition result collection may be sorted according to a descending order of the similarity.

In block 410, a recognition result may be returned to the client.

According to an example of the present disclosure, a recognition result may be defined to mean that the recognition is not passed, or may be a sorted recognition result collection.

According to an example of the present disclosure, the biometric-based recognition method may be illustrated as follows. It may be assumed that a user A logs in an IM application, such as Tencent QQ, at a mobile phone A (i.e., a client), and a login password is a face of the user A. The user A has registered three QQ numbers at the mobile phone A, which may be referred to as QQ number A, QQ number B, and QQ number C, respectively. As such, a process of recognizing the user A may be illustrated as follows. When the user A wants to log in QQ at the mobile phone A, the user A may collect the face of the user A using the mobile phone A and may send the face of the user A and an ID of the mobile phone A (i.e., a client ID) to a cloud server for recognition. If the recognition at the cloud server is passed, the QQ numbers A, B, and C may be returned to the mobile phone A. The user A may select any one of the QQ numbers A, B, and C to directly log in the QQ without performing the verification process. In other words, when the recognition is passed, the corresponding verification is passed, as well.

Examples of the present disclosure provide a biometric-based recognition method, in which a client may obtain a biometric image and send the biometric image to a cloud server; the cloud server may perform feature extraction to the biometric image to obtain a biometric template, perform biometric-based recognition to a user or the client, and return a corresponding user ID. In this case, the feature extraction process may be implemented at the cloud server side, so that the complexity of the client may be reduced, the expandability of the client may be increased, a limitation that the biometric recognition may only be implemented on the client may be eliminated, and diversified utilization may be supported.

Figure 11:
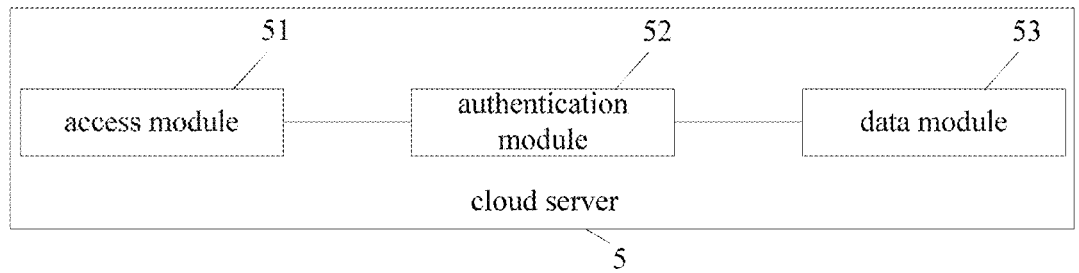
FIG. 11 is a schematic diagram illustrating a structure of a cloud server, according to an example of the present disclosure.

As shown in FIG. 11, according to an example of the present disclosure, a cloud server 5 may be provided. The cloud server 5 may include:

an access module 51, to receive a biometric image to be authenticated sent from a client;

an authentication module 52, to perform feature extraction to the biometric image to be authenticated, which is received by the access module 51, to obtain a biometric template to be authenticated, compare the biometric template to be authenticated with a biometric template pre-stored in a data module 53, and return an authentication result; and the data module 53, to store the biometric template.

In the cloud server 5 as described above, the access module 51 may be implemented by the access server provided by the examples of the present disclosure, the authentication module 52 may be implemented by the verification server or the recognition server provided by the examples of the present disclosure, and the data module 53 may be implemented by the data server provided by the examples of the present disclosure.

Figure 12:
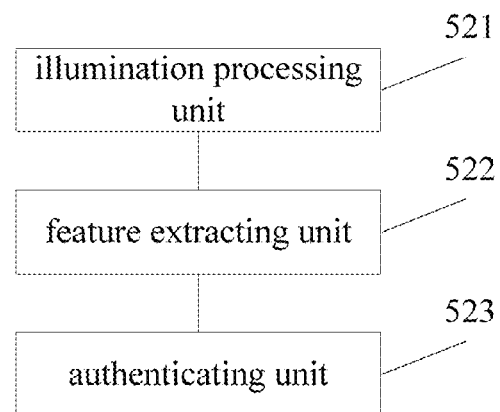
FIG. 12 is a schematic diagram illustrating a structure of an authentication module in a cloud server, according to an example of the present disclosure.

As shown in FIG. 12, according to an example of the present disclosure, the authentication module 52 may include:

an illumination processing unit 521, to perform illumination-normalization processing to the biometric image to be authenticated;

a feature extracting unit 522, to perform the feature extraction to the biometric image to be authenticated which is processed with the illumination normalization, perform dimension-reducing calculation to an extracted feature, and link results of the dimension-reducing calculation one by one to obtain the biometric template to be authenticated; and an authenticating unit 523, to compare the biometric template to be authenticated that is obtained by the feature extracting unit 522 with the biometric template pre-stored in the data module 53, and return the authentication result.

Figure 13:
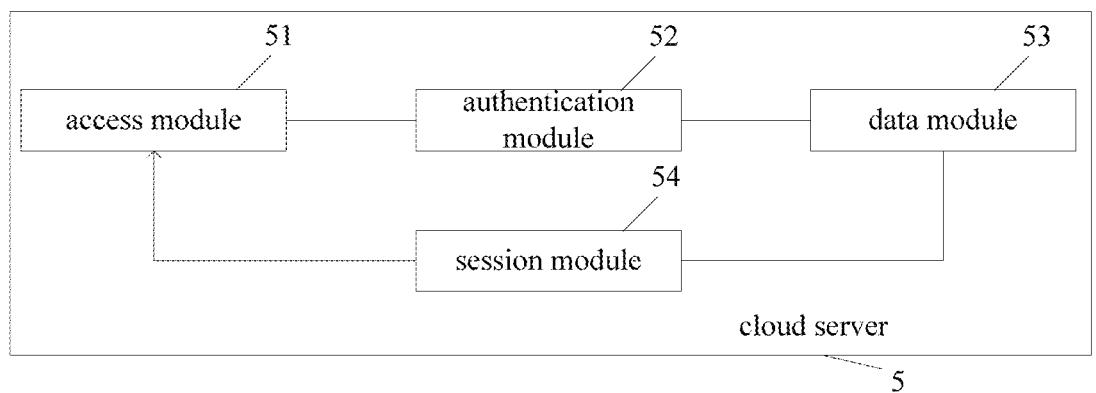
FIG. 13 is a schematic diagram illustrating a second structure of a cloud server, according to an example of the present disclosure.

According to an example of the present disclosure, before receiving the biometric image to be authenticated sent from the client, the access module 51 may further receive a biometric image, a client ID, and a user ID that are sent from the client. Accordingly, as shown in FIG. 13, the cloud server 5 may further include:

a session module 54, to perform the feature extraction to the biometric image received by the access module 51 to obtain a biometric template, and send a relationship associated with the biometric template, the client ID, and the user ID that are received by the access module 51 to the data module 53 to complete the registration of the user, and may return a registration result.

Accordingly, the data module 53 may further store the relationship associated with the biometric template, the client ID, and the user ID, which is sent by the session module 54.

In this case, the session module 54 in the cloud server 5 as described above may be implemented by the session server provided by the examples of the present disclosure.

Figure 14:
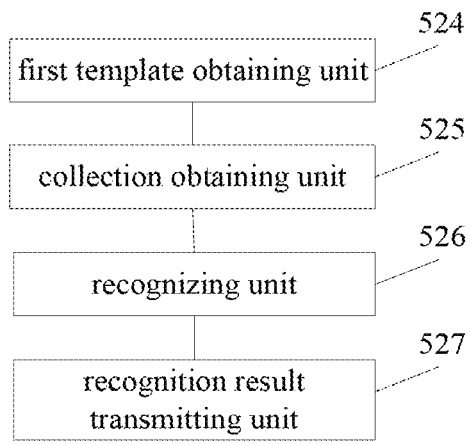
FIG. 14 is a schematic diagram illustrating a second structure of an authentication module in a cloud server, according to an example of the present disclosure.

According to an example of the present disclosure, when receiving the biometric image to be authenticated sent from the client, the access module 51 may further receive the client ID sent from the client. Accordingly, as shown in FIG. 14, the authentication module 52 may further include:

a first template obtaining unit 524, to perform the feature extraction to the biometric image to be authenticated that is received by the access module 51 to obtain the biometric template to be authenticated;

a collection obtaining unit 525, to search, according to the client ID received by the access module 51, from the biometric template stored in the data module 53 to obtain a collection of a biometric template associated with the client ID;

a recognizing unit 526, to calculate a similarity between the biometric template to be authenticated that is obtained by the first template obtaining unit 524 and each biometric template included in the collection obtained by the collection obtaining unit 525; when a similarity between the biometric template to be authenticated and a biometric template included in the collection is greater than a predetermined recognition threshold, add a user ID associated with the biometric template included in the collection to a recognition result collection; otherwise, determine that the recognition is not passed; and a recognition result transmitting unit 527, to sort the user ID in the recognition result collection according to a descending order of the similarity, and return the recognition result collection to the client through the access module 51.

According to an example of the present disclosure, a recognition result may be defined to mean that the recognition is not passed, or may be a sorted recognition result collection.

In this case, the authentication module 52 as shown in FIG. 14 may be implemented by the recognition server provided by the examples of the present disclosure.

Figure 15:
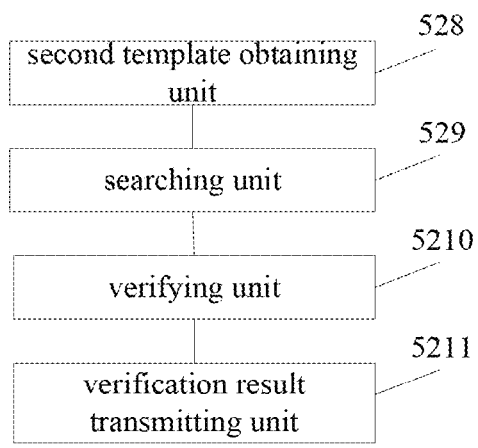
FIG. 15 is a schematic diagram illustrating a third structure of an authentication module in a cloud server, according to an example of the present disclosure.

According to an example of the present disclosure, upon receiving the biometric image to be authenticated sent from the client, the access module 51 may further receive the client ID and the user ID that are sent from the client. Accordingly, as shown in FIG. 15, the authentication module 52 may further include:

a second template obtaining unit 528, to perform the feature extraction to the biometric image to be authenticated that is received by the access module 51 to obtain the biometric template to be authenticated;

a searching unit 529, to search out, according to the client ID and the user ID that are received by the access module 51, a biometric template associated with the client ID and the user ID;

a verifying unit 5210, to calculate a similarity between the biometric template to be authenticated that is obtained by the second template obtaining unit 528 and the biometric template that is obtained by the searching unit 529 and is associated with the client ID and the user ID that are received by the access module 51; when the calculated similarity is greater than a predetermined verification threshold, determine that the verification of the user is passed; otherwise, determine that the verification of the user is not passed; and a verification result transmitting unit 5211, to return a verification result to the client through the access module 51.

In this case, the authentication module 52 as shown in FIG. 15 may be implemented by the verification server provided by the examples of the present disclosure.

The modules and/or units in the examples of the present disclosure may be software (e.g., computer readable instructions stored in a computer readable medium and executable by a processor), hardware (e.g., the processor of an application specific integrated circuit (ASIC)), or a combination thereof. The modules and/or units in the examples of the present disclosure may be deployed either in a centralized or a distributed configuration.

Examples of the present disclosure provide a cloud server, which may obtain a biometric image sent from a client, perform feature extraction to the biometric image to obtain a biometric template, and may perform biometric-based authentication to a user or the client. In this case, the feature extraction process may be implemented at the cloud server side, so that the complexity of the client may be reduced, the expandability of the client may be increased, a limitation that the biometric recognition may only be implemented on the client may be eliminated, and diversified utilization may be supported.

Figure 16:
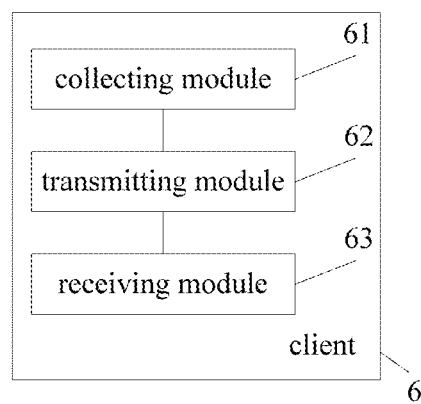
FIG. 16 is a schematic diagram illustrating a structure of a client, according to an example of the present disclosure.

As shown in FIG. 16, according to an example of the present disclosure, a client 6 may be provided. The client 6 may include:

a collecting module 61, to collect a user image, and perform biometric-positioning processing to the user image to obtain a biometric image to be authenticated;

a transmitting module 62, to transmit the biometric image to be authenticated that is obtained by the collecting module 61 to a cloud server, so that the cloud server may perform feature extraction to the biometric image to be authenticated to obtain a biometric template to be authenticated, and may compare the biometric template to be authenticated with a biometric template pre-stored in the cloud server; and a receiving module 63, to receive an authentication result returned from the cloud server.

Figure 17:
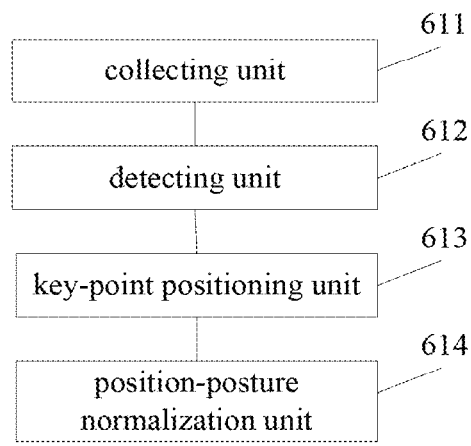
FIG. 17 is a schematic diagram illustrating a structure of a collecting module in a client, according to an example of the present disclosure.

According to an example of the present disclosure, as shown in FIG. 17, the collecting module 61 as described above may include:

a collecting unit 611, to collect the user image;

a detecting unit 612, to determine and mark, upon detecting that a predetermined biometric is included in the user image, a position of the biometric;

a key-point positioning unit 613, to select a key-point position of the biometric, and obtain a coordinate of the key-point position; and a position-posture normalization unit 614, to perform, based on the coordinate of the key-point position obtained by the key-point positioning unit 613, posture correcting to the key-point position to obtain the biometric image to be authenticated.

The modules and/or units in the examples of the present disclosure may be software (e.g., computer readable instructions stored in a computer readable medium and executable by a processor), hardware (e.g., the processor of an application specific integrated circuit (ASIC)), or a combination thereof. The modules and/or units in the examples of the present disclosure may be deployed either in a centralized or a distributed configuration.

Figure 18:
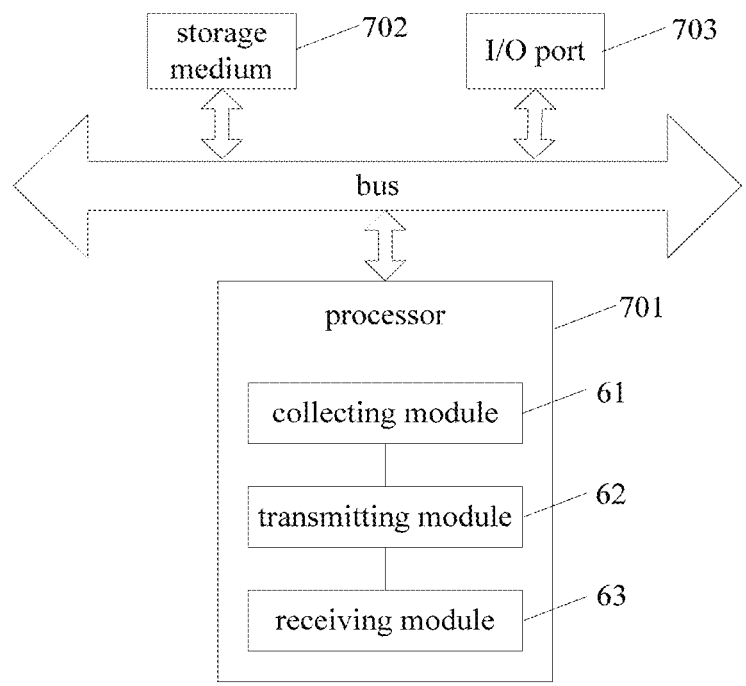
FIG. 18 is a schematic diagram illustrating a hardware structure of a client, according to an example of the present disclosure.

FIG. 18 is a schematic diagram illustrating a hardware structure of the client, according to an example of the present disclosure. As shown in FIG. 18, the client may include a processor 701, a storage medium 702, and I/O port 703, in which the storage medium 702 may store computer instructions, and the processor 701 may execute the computer instructions to perform operations including:

collecting a user image, and performing biometric-positioning processing to the user image to obtain a biometric image to be authenticated;

transmitting the obtained biometric image to be authenticated to a cloud server, so that the cloud server may perform feature extraction to the biometric image to be authenticated to obtain a biometric template to be authenticated, and may compare the biometric template to be authenticated with a biometric template pre-stored in the cloud server; and receiving an authentication result returned from the cloud server.

The processor 701 may execute the computer instructions to further perform operations including:

determining and marking, upon detecting that a predetermined biometric is included in the user image, a position of the biometric;

selecting a key-point position of the biometric, and obtaining a coordinate of the key-point position; and performing, based on the obtained coordinate of the key-point position, posture correcting to the key-point position to obtain the biometric image to be authenticated.

The storage medium 702 as described above may be a transitory storage medium (such as random access memory (RAM)), a non-transitory storage medium (such as read-only memory (ROM), or flash memory), or a combination thereof, which may not be limited herein.

As may be seen that when the computer instructions stored in the storage medium 702 are executed by the processor 701, functions of the aforementioned collecting module 61, the transmitting module 62, and the receiving module 63 are achieved.

Examples of the present disclosure provide a client, which may obtain a biometric image of a user, and send the biometric image to a cloud server; the cloud server may perform feature extraction to the biometric image to obtain a biometric template, and may perform biometric-based authentication to the user or the client. In this case, the feature extraction process may be implemented at the cloud server side, so that the complexity of the client may be reduced, the expandability of the client may be increased, a limitation that the biometric recognition may only be implemented on the client may be eliminated, and diversified utilization may be supported.

According to an example of the present disclosure, a biometric-based authentication system may further be provided. The biometric-based authentication system may include the cloud server 5 and the client 6 as described above.

Those skilled in the art may understand that all or part of the procedures of the methods of the above examples may be implemented by hardware, or by hardware following machine readable instructions of a computer program. The computer program may be stored in a computer readable storage medium. When running, the computer program may provide the procedures of the above method examples. The storage medium may be diskette, CD, ROM, or RAM, etc.

The above are several examples of the present disclosure, and are not used for limiting the protection scope of the present disclosure. Any modifications, equivalents, improvements, etc., made under the principle of the present disclosure should be included in the protection scope of the present disclosure.

The invention claimed is:

1. A method for processing a biometric image, the method comprising:

acquiring the biometric image of a predetermined part of a user;

determining, by processing circuitry of a terminal, a position of the predetermined part of the user in the acquired biometric image;

selecting, by the processing circuitry, a key-point of the user in the acquired biometric image of the predetermined part of the user;

obtaining, by the processing circuitry, a candidate area of the selected key-point and a coordinate of the selected key point from the obtained candidate area; and converting the acquired biometric image to a standard biometric image by normalization operations according to the coordinate of the selected key-point in the acquired biometric image so that the key point of the user appears in a standard position in the standard biometric image.

2. The method according to claim 1, wherein the predetermined part of the user includes a face or a finger of the user.

3. The method according to claim 1, wherein
the predetermined part of the user includes a face of the user, and
the key-point is one of an eye and a mouth of the user.

4. The method according to claim 1, further comprising:
sending a registration request to a server, the registration request including the standard biometric image and a user ID.

5. The method according to claim 1, further comprising:
sending a verification request to a server, the verification request including the standard biometric image and a user ID, and
receiving a verification result from the server that indicates whether the standard biometric image has a calculated similarity with a registered biometric image associated with the user ID.

6. The method according to claim 1, further comprising:
sending a recognition request to a server, the recognition request including the standard biometric image, and
receiving at least one user ID that is determined by the server to be associated with the standard biometric image.

7. The method according to claim 6, further comprising:
displaying a plurality of user IDs that can be used to log into an application that is executed on the terminal when the at least one user ID is included in the plurality of user IDs.

8. A terminal, comprising:
processing circuitry configured to:
acquire a biometric image of a predetermined part of a user;
determine a position of the predetermined part of the user in the acquired biometric image;
select a key-point of the user in the acquired biometric image of the predetermined part of the user;
obtain a candidate area of the selected key-point and a coordinate of the selected key point from the obtained candidate area; and
convert the acquired biometric image to a standard biometric image by normalization operations according to the coordinate of the selected key-point in the acquired biometric image so that the key point of the user appears in a standard position in the standard biometric image.

9. The terminal according to claim 8, wherein the predetermined part of the user includes a face or a finger of the user.

10. The terminal according to claim 8, wherein
the predetermined part of the user includes a face of the user, and
the key-point is one of an eye and a mouth of the user.

11. The terminal according to claim 8, wherein the processing circuitry is configured to send a registration request to a server, the registration request including the standard biometric image and a user ID.

12. The terminal according to claim 8, wherein the processing circuitry is configured to:
send a verification request to a server, the verification request including the standard biometric image and a user ID, and
receive a verification result from the server that indicates whether the standard biometric image has a calculated similarity with a registered biometric image associated with the user ID.

13. The terminal according to claim 8, wherein the processing circuitry is configured to:
send a recognition request to a server, the recognition request including the standard biometric image, and
receive at least one user ID that is determined by the server to be associated with the standard biometric image.

14. The terminal according to claim 13, wherein the processing circuitry is configured to display a plurality of user IDs that can be used to log into an application that is executed on the terminal when the at least one user ID is included in the plurality of user IDs.

15. A non-transitory computer-readable medium storing instructions which when executed by a computer cause the computer to perform a method for processing a biometric image, the method comprising:
acquiring the biometric image of a predetermined part of a user;
determining a position of the predetermined part of the user in the acquired biometric image;
selecting a key-point of the user in the acquired biometric image of the predetermined part of the user;
obtaining a candidate area of the selected key-point and a coordinate of the selected key point from the obtained candidate area; and
converting the acquired biometric image to a standard biometric image by normalization operations according to the coordinate of the selected key-point in the acquired biometric image so that the key point of the user appears in a standard position in the standard biometric image.

16. The non-transitory computer-readable medium according to claim 15, wherein the predetermined part of the user includes a face or a finger of the user.

17. The non-transitory computer-readable medium according to claim 15, wherein
the predetermined part of the user includes a face of the user, and
the key-point is one of an eye and a mouth of the user.

18. The non-transitory computer-readable medium according to claim 15, wherein the method further comprises:
sending a registration request to a server, the registration request including the standard biometric image and a user ID.

19. The non-transitory computer-readable medium according to claim 15, wherein the method further comprises
sending a verification request to a server, the verification request including the standard biometric image and a user ID, and
receiving a verification result from the server that indicates whether the standard biometric image has a calculated similarity with a registered biometric image associated with the user ID.

20. The non-transitory computer-readable medium according to claim 15, wherein the method further comprises:
sending a recognition request to a server, the recognition request including the standard biometric image, and
receiving at least one user ID that is determined by the server to be associated with the standard biometric image.

* * * * *